Nov. 17, 1936.  P. A. MARSAL  2,060,818
GALVANIC CELL
Filed Nov. 10, 1932
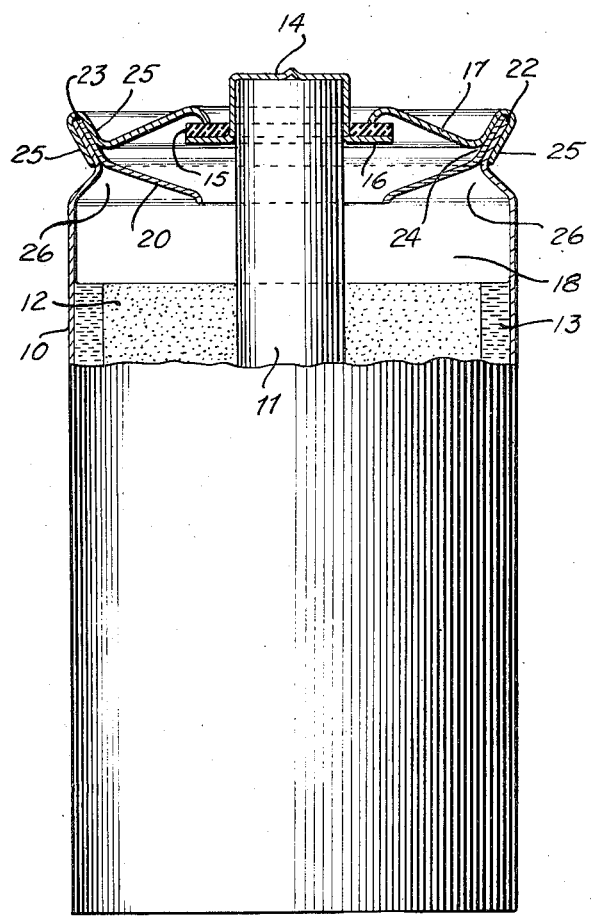
INVENTOR
PAUL A. MARSAL.
BY
ATTORNEY Patented Nov. 17, 1936

2,060,818

UNITED STATES PATENT OFFICE 2,060,818

GALVANIC CELL

Paul A. Marsal, Lakewood, Ohio, assignor, by mesne assignments, to Union Carbide and Carbon Corporation, a corporation of New York Application November 10, 1932, Serial No. 642,068

18 Claims. (Cl. 136—133)

This invention relates to galvanic cells, and more specifically to dry cells in which the sealing closure comprises a metal or metals electrochemically different from one of the electrodes, particularly the anode, and in which at least a part of the surface of such closure is exposed within the cell. In such cells, the sealing closure may comprise an annular metal disc having its outer margin secured to the upper end of the outer electrode or anode and having its inner margin disposed adjacent the metal cap on the upper end of the inner electrode, and a dielectric forming a mechanical continuity and an electric gap between said disc and said cap.

Very serious efficiency losses occur in such cells when the exposed interior metal surfaces of the closure become moistened with a film of electrolyte communicating with the main body of electrolyte. For example, such moistening of the internally exposed portion of the usual brass cap on the central carbon electrode establishes a bleeding circuit which may exhaust the cell in a short time; and in less severe cases may cause copper to be dissolved in the cell, which greatly increases the rate of local action at the anode and shortens the shelf life of the cell. When a similar electrolytic contamination is established at the joint between the usual zinc anode and the sealing disc of different or more electropositive metal, such as iron, the rate of local action at the anode increases and the shelf life of the cell is reduced.

It is common practice to place a highly bibulous separator in contact with the anode of a dry cell, which separator consists of, or is coated with, a pasty electrolyte. The electrolytic contamination or moistening of the top structure in the cell is due chiefly to the expansion and migration of this electrolyte within the cell. The expansion and migration may result either from especially heavy use of the cell or even idle storage under severe conditions of temperature and humidity. Contamination also results in those cells in which the electrolyte is of sufficient fluidity to flow to the top when the cell is inverted or rests on its side for a period of time.

Therefore, the principal objects of the invention are: to inhibit or prevent electrolytic contamination of the exposed metal surfaces of the top structure of a dry cell; and to provide a simple and inexpensive means for this purpose which may be readily embodied in the well-known type of dry cell without reducing the capacity of the cell or detracting from its utility or appearance.

These and other objects and the novel features will appear in the following description and the accompanying illustration showing a sectional view taken longitudinally through the center of a dry cell embodying one example of an application of this invention.

According to this invention, electrolytic contamination of the metal closure surfaces exposed within the cell is prevented or inhibited by a barrier or apron which is secured to the upper end of the outer or metal electrode, to the outer margin of the cell closure, or to both, and which extends downwardly and inwardly toward the inner or carbon electrode. This barrier provides a much longer creepage path between the closure and the body of electrolyte, as well as a trough in a position to hold a substantial quantity of electrolyte, thus preventing migration and access of the electrolyte to the closure.

The drawing shows the invention applied to a modern dry cell which comprises an outer zinc container electrode or anode 10; a central inner carbon electrode 11; a cylindrical depolarizer mix or bobbin 12 in which the lower end of the electrode 11 is embedded; a gelatinized electrolyte 13 in an annular space between the anode 10 and the bobbin 12; a brass cap 14 mounted on the upper end of the electrode 11; a dielectric washer 15 of pulpboard or the like carried by an outturned flange 16 at the lower edge of the cap 14; and a resilient annular sheet iron disc 17 having its outer margin permanently secured to the upper end of the anode 10 and having its inner margin yieldingly engaging the washer 15. The height of the bobbin 12 and the normal level of the electrolyte 13 are such as to leave a gas space 18 in the cell below the sealing closure provided by the disc 17, the cap 14, and the washer 15 clamped therebetween.

The protective barrier or baffle of this invention consists of an annular dished or substantially frusto-conical apron 20 which is preferably secured in the joint between the anode 10 and the sealing disc 17, and extends downwardly and inwardly into the space 18 and is disposed at an angle to both the anode and the disc. The inner margin of the apron 20 may be turned downward more or less than shown and its inner edge is preferably spaced from the electrode 11 to avoid electrical contact with the latter when the apron is made of metal and to leave a free passage through which cell gas may reach the vent or vents in the closure. In the absence of a protective barrier and when the disc 17 consists of iron, electrolyte reaching the joint between disc 17 and the zinc anode 10 will establish an electromotive couple tending to increase local action at the anode. The apron 20 is preferably formed of material which is identical with the anode 10, since contact with the electrolyte then can set up no detrimental electromotive couples and a substantial increase in active anode area is also provided. However, the apron may consist of other materials, such as fiber or pulpboard, which will not form part of a couple. When the construction at the cathode exposes connection members such as brass or copper inside the sealing disc, fiber, zinc or even iron aprons are useful.

Various methods may be employed to properly secure the apron in place and unite the sealing disc and the anode. As shown, the upper end 22 of the anode 10 is offset inwardly and then flares outwardly. The outer margin 23 of the apron is shaped to fit flat against and rests upon the inner inclined face of the outwardly flaring end 22, the edges of the parts 22 and 23 being substantially coextensive. The assembly is completed by tightly clamping the parts 22 and 23, so disposed, within and between the walls of an annular recess 24 in the outer margin 25 of the sealing disc 17, thereby forming a fluid-tight joint of compression which permanently unites the disc, anode, and apron, and prevents the passage of gas and liquid through this joint.

The space between the under side of apron 20 and the inner surface of the cylindrical container anode 10 provides an annular trough 26 in which any electrolyte flowing toward the closure is caught and held until the cell is returned to an upright position, whereupon it will drain back to its original position around the cathode mix 12.

The electrolyte will creep over the surface of a metal, such as the zinc electrode, more readily than over the surface of a non-metal, such as the carbon electrode. The long creepage path provided by the apron therefor substantially prevents migration of electrolyte to the closure and thus avoids the creation of galvanic couples between the closure and the anode. Where the apron and anode are of the same metal, such as zinc, any film of electrolyte that may form on the under side of the apron increases the active anode area and improves the efficiency of the cell.

The protective barrier may be of other forms and located in other positions and secured by different means than those here shown. It will be understood that other changes may be made in the details herein disclosed without departing from the principles of the invention.

I claim:

1. In a galvanic cell comprising a metal container anode, a closure comprising metal different from that of said container, and an electrolyte that tends to creep over the inner surfaces of said metals and form deleterious galvanic couples therebetween; means for increasing the length of the creepage path between said electrolyte and said closure comprising a barrier extending from said container into said cell between said electrolyte and said closure.

2. A galvanic cell according to claim 1, in which said barrier consists of metal.

3. A galvanic cell according to claim 1, in which said anode and said barrier are both of metal and have substantially identical electrochemical properties.

4. A galvanic cell according to claim 1, in which said barrier consists of fiber or the like.

5. A galvanic cell according to claim 1, in which said barrier is secured to said anode.

6. A galvanic cell according to claim 1, in which said closure is secured to said anode and said barrier is disposed between the inner surfaces of said anode and said closure.

7. A galvanic cell according to claim 1, in which said barrier cooperates with said anode to provide a trough.

8. A galvanic cell according to claim 1, in which a gas collecting space is provided between said closure and said electrolyte, and said barrier is secured to said anode and extends into said gas space.

9. A galvanic cell according to claim 1, in which said anode, said closure, and said barrier are united by a fluid-tight joint of compression.

10. A galvanic cell according to claim 1, in which said closure is secured to the upper end of said container, a gas space is provided below said closure, and said barrier is secured to said container and extends inwardly and downwardly therefrom into said space.

11. A galvanic cell according to claim 1, in which said anode is a cylindrical container, and said barrier is a substantially frusto-conical apron having its outer margin secured to said container and extending inwardly and downwardly within said container.

12. A galvanic cell according to claim 1, in which said anode is a cylindrical container, said cell comprises an electrode disposed centrally in said container, a gas space is provided in said container below said closure, said closure extends between said electrode and the upper end of said container and is secured to the latter, and said barrier comprises a substantially frusto-conical apron having its outer margin secured between said closure and said container by a fluid-tight joint, said apron extending inwardly and downwardly from said joint into said gas space and having its inner margin disposed adjacent said electrode.

13. A dry cell comprising a metal container electrode, a cooperating electrode therein, a body of electrolyte between said electrodes, a sealing closure for said cell comprising a metal electrochemically different from that of said container, and a metal apron secured to the inner side of said container electrode and extending inwardly above said body of electrolyte below said closure, electrochemical properties of the metals of said container and said apron being substantially identical.

14. A dry cell according to claim 13, in which said container and said apron both consist of zinc, said cell has a gas space between said closure and said body of electrolyte, and said apron projects into said space and is normally spaced from said body of electrolyte and from said cooperating electrode.

15. A dry cell comprising a container electrode; an electrode disposed centrally in said container electrode; an electrolyte between said electrodes; a sealing closure for the cell permanently secured to said container electrode and comprising metal exposed within the cell; a gas space below said closure; and a barrier to inhibit electrolytic contamination of such exposed metal, comprising a substantially frusto-conical apron permanently secured between said closure and said container by a fluid-tight joint and extending inwardly and downwardly from said joint into said gas space and having its inner margin spaced from such central electrode.

16. A dry cell comprising a metal container electrode, a cooperating electrode therein, a body of electrolyte between said electrodes, a sealing closure for said cell comprising metal exposed within the cell and electrochemically different from said container electrode, and means in the cell permanently and fluid-tightly secured to said container electrode between said body of electrolyte and said exposed metal for substantially increasing the length of the creepage path between said body of electrolyte and such exposed metal and inhibiting electrolytic contamination of the latter.

17. A dry cell comprising a cylindrical zinc container electrode; a cathode therein having a central carbon electrode, a body of electrolyte between said cathode and said zinc electrode; a sealing closure for said cell comprising a brass cap on said carbon electrode, an annular resilient iron disc having its outer margin permanently joined to the upper end of said zinc container and its inner margin supported by said cap, portions of said cap and said disc being exposed within said cell; a gas collecting space in the cell between said closure and said body of electrolyte; and means in the cell substantially increasing the length of the creepage path between said body of electrolyte and such exposed metal portions and substantially preventing electrolytic contamination of the latter, said means comprising a substantially frusto-conical zinc apron having its outer margin secured to the joint between said container and disc and extending downwardly and inwardly therefrom into said gas space but spaced from said carbon electrode.

18. A dry cell comprising a cylindrical metallic container electrode; a centrally disposed carbon cathode therein; a body of electrolyte between said cathode and said container; a sealing closure for said cell comprising a metal cap on said carbon electrode, an annular metallic disc having its outer margin permanently joined to the upper end of said container and its inner margin adjacent to and electrically insulated from said cap, portions of said cap and said disc being exposed within said cell; a gas collecting space in the cell between said closure and said body of electrolyte; and means in the cell substantially increasing the length of the creepage path between said body of electrolyte and such exposed metal portions and substantially preventing electrolytic contamination of the latter, said means comprising a barrier extending from said container into said cell between said electrolyte and said closure.

PAUL A. MARSAL.